Patented May 21, 1935

2,002,099

UNITED STATES PATENT OFFICE 2,002,099

BATTERY TERMINAL

Edward Schilke, Middletown, Conn.

Application February 25, 1932, Serial No. 595,094

2 Claims. (Cl. 173—259)

My invention relates to devices more especially employed for securing a cable in electrical connection with the poles or posts of batteries, and an object of my invention, among others, is the production of a device of this type that will eliminate, or at least greatly reduce, the collection of matter, commonly referred to as corrosion, on the exposed ends of such posts.

One form of a device embodying my invention and in the construction and use of which the objects herein set out, as well as others, may be attained is illustrated in the accompanying drawing, in which—

Figure 1 is a top view of a battery equipped with my improved connection.

Figure 2 is a side view of the same with the coupling clamp and my improved bushing removed.

Figure 3 is a view on enlarged scale in section through my improved connection and the upper portion of a battery cell on a plane denoted by the dotted line 3—3 of Figure 1, and Figure 4 is a view in cross section through the clamp, bushing and battery post.

As is well known the action of a battery causes a deposit at the exposed ends of the poles or posts, this deposit being commonly referred to as corrosion and which practically, in a short time, covers the end of a post and the coupling clamp attached thereto unless such deposit is removed. In any event this deposit is very objectionable, both as to its unsightliness and also as affecting the efficiency of the battery, particularly as to the positive pole thereof. I have a theory, although I do not set this out as a fact, that this deposit is an accumulation from fumes from within the battery seeping through the seam between the edge of the opening in the top of the cell and the post or pole, but whatever the cause I have demonstrated that by the use of my improved connection on a battery having this objectionable feature before such connection was applied, the deposit has been practically eliminated.

This, my improved connection, is shown in the drawing herein in which the numeral 5 denotes the case of a battery containing, in the structure herein shown, three cells 6 each having a filling opening closed by a cap 7 in a manner common to batteries of this type. Each cell contains a set of positive and negative plates collectively denoted by the numeral 8 and separated by spacers 9, a grid 10 being connected with each set of positive and negative plates in a manner common to battery construction. Each grid has a post 11 extending outwardly therefrom through an opening in the top of the cell, such posts comprising the poles of the battery and each post being secured in position as by means of a clamping nut 12 on the opposite side of the top from a shoulder at the base of the post within the cell to tightly clamp the post in position.

In carrying my invention into effect I provide a bushing 13 having an enlarged base 14 that is fitted to set snugly against the top of the cell, and as shown in Figure 3 of the drawing. A chamber 15 is formed within the base surrounding the nut 12 and passages 16 are formed by grooves extending lengthwise along the inner surface of the bushing to provide passages from the chamber 15 to the exterior of the structure.

By means of this construction all fumes which may seep through the opening in the top of the cell and through the seam between the shoulder at the base of the post and the inner surface of the top of the cell and the seam between the outer surface of the top of the cell and the nut 12 will be carried off through the passages 16, and this escape of the fumes will be aided in the case of moving vehicles by the drafts created by such movement.

While in the specific form of my invention illustrated herein the grooves 16 are shown as formed in the bushing, it will be understood that these grooves may be otherwise formed so long as they exist between the bushing and the post.

In accordance with the provisions of the patent statutes I have described the principles of operation of my invention together with the device which I now consider to represent the best embodiment thereof; but I desire to have it understood that the device shown is only illustrative, and that the invention may be carried out by other means and applied to uses other than those above set out.

I claim:

1. In combination with a battery cell including a post projecting from within the cell to the top thereof, a bushing surrounding said post and having an enlarged base with a chamber therein, said base being seated snugly against the top of the cell and the bushing when finally secured in place having a lengthwise passage communicating with said chamber and extending the full length of the bushing and out at the top thereof for free and unobstructed outflow of fumes from between said post and bushing.

2. In combination with a battery cell including a post projecting from within the cell to the top thereof, and having a nut for securing the post to the cell, a bushing surrounding said post and when finally secured in place having a broadened base with a chamber therein creating a free space around said nut and with passages extending from said chamber along the interior of the bushing to the outer end thereof for free and unobstructed outflow of fumes from between said post and bushing.

EDWARD SCHILKE.

May 21, 1935.  S. SMITH  2,002,100
SHOCK ABSORBER
Filed June 27, 1932  2 Sheets-Sheet 1
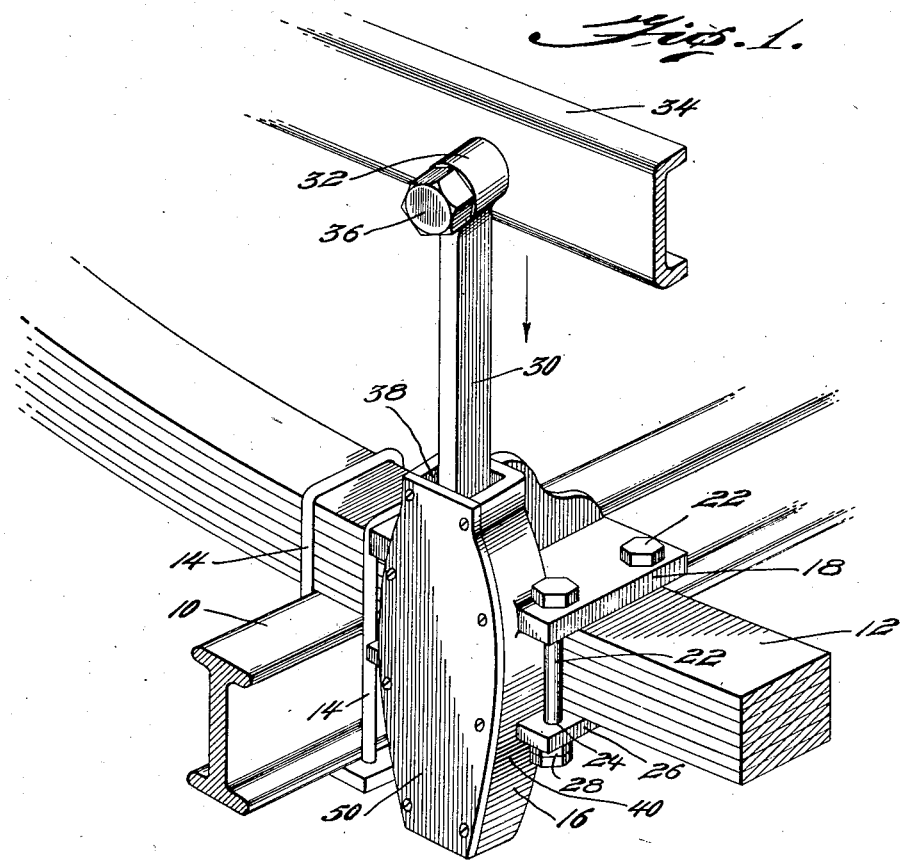
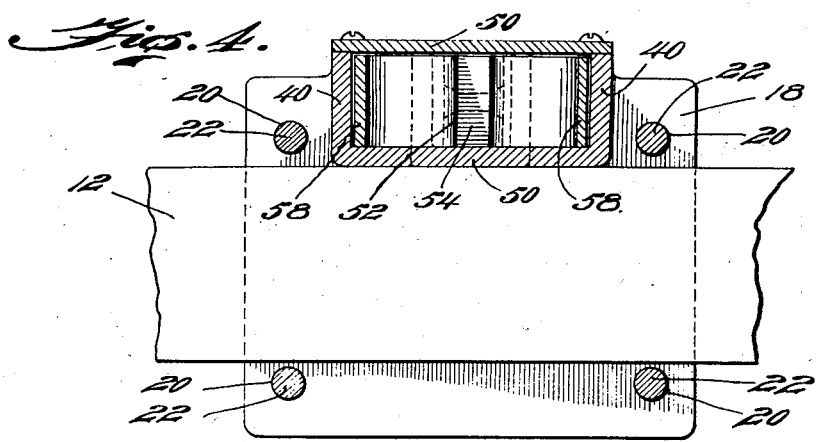
Inventor
Sheffield Smith
By Thomas A. Juckes
Attorney